Figure 1:
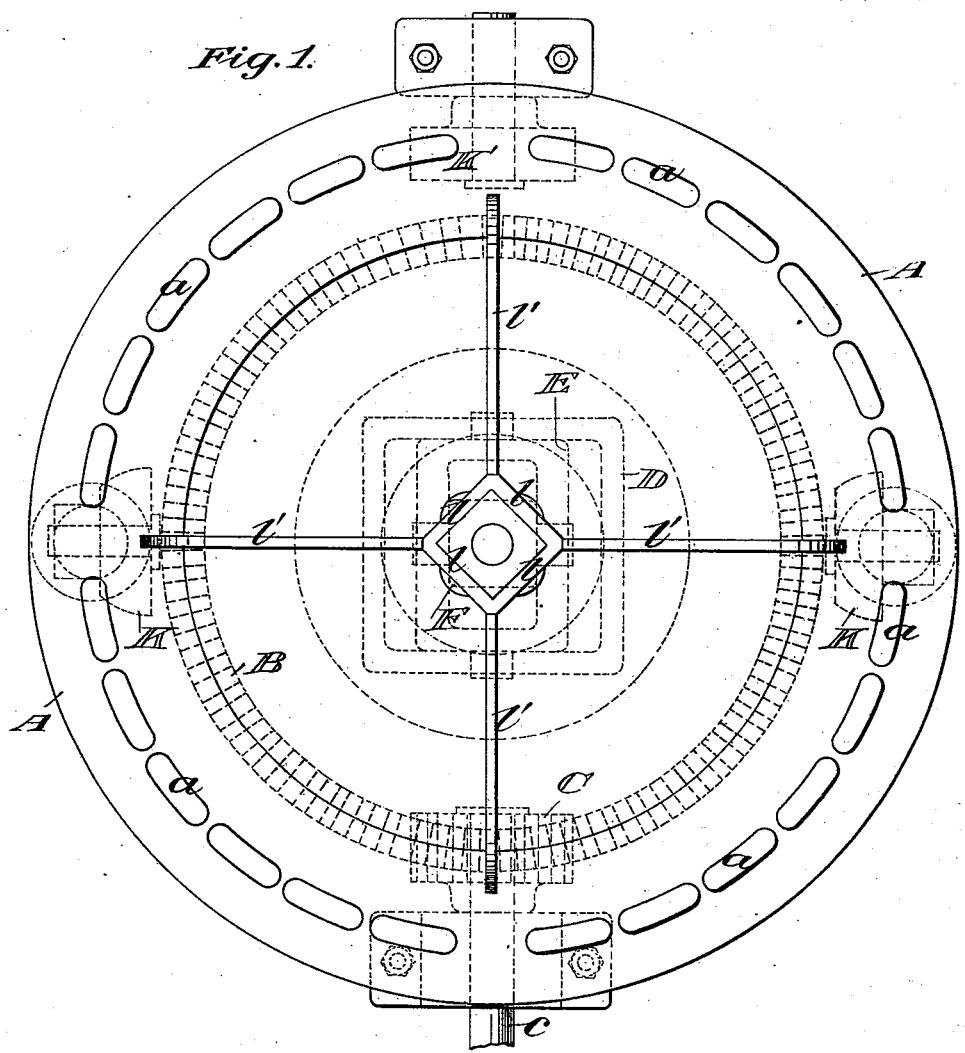
Figure 4:
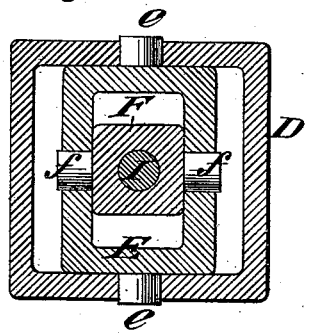
Figure 2:
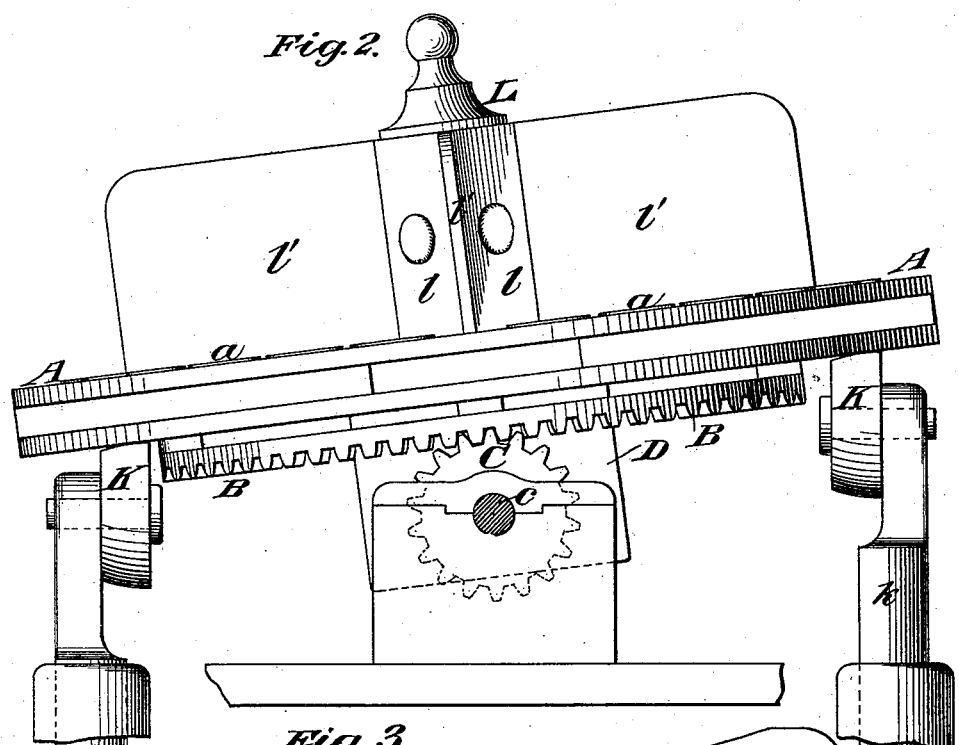
Figure 3:
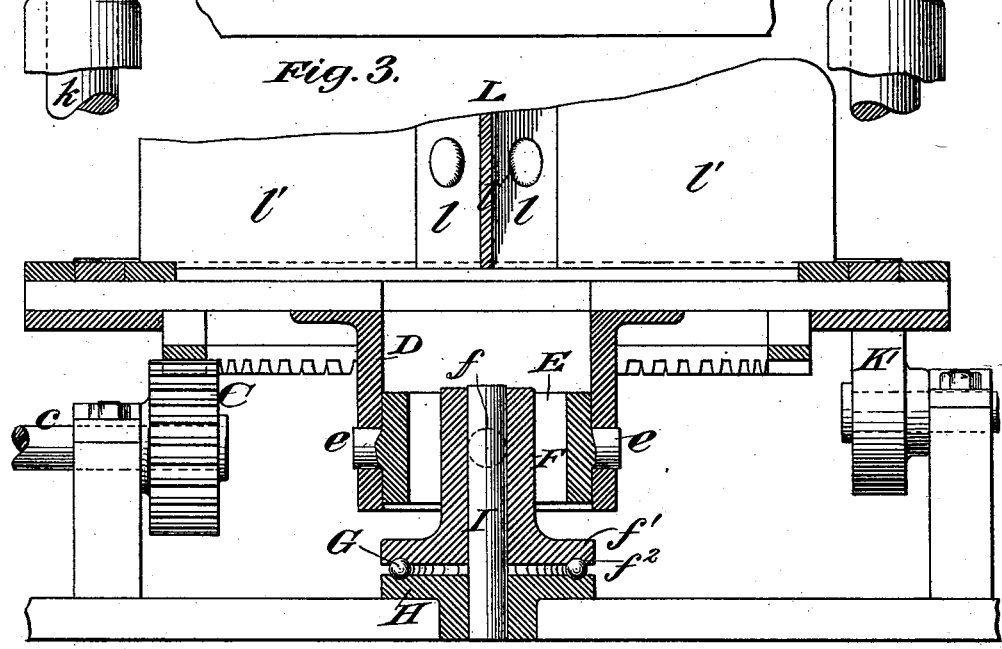
Figure 5:
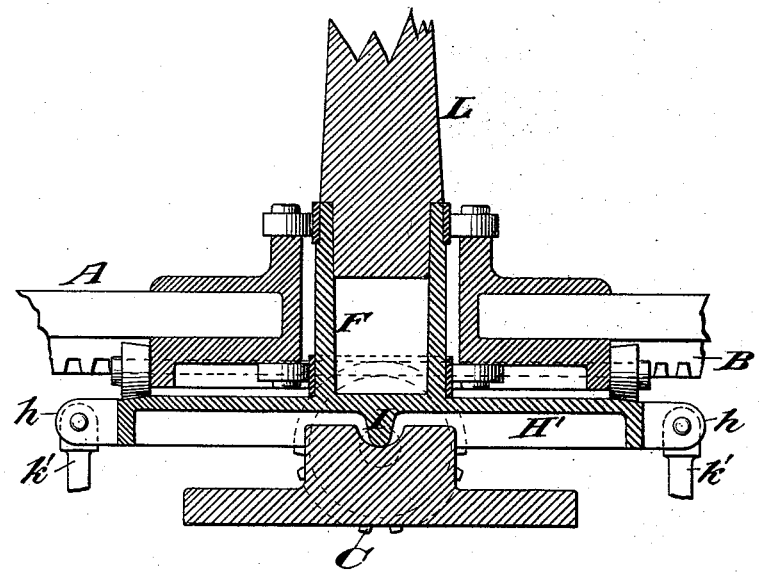

(No Model.) 3 Sheets—Sheet 1.

G. BAUM.
CARROUSEL.

No. 468,962. Patented Feb. 16, 1892.

Witnesses:
F. C. Fischer
D. H. Haynard

Inventor:
George Baum
by attorneys
Brown & Seward (No Model.) 3 Sheets—Sheet 2.

G. BAUM.
CARROUSEL.

No. 468,962. Patented Feb. 16, 1892.

Witnesses:—
D. H. Haywood
C. L. Sundgren

Inventor:
George Baum
by attorneys
Brown & Seward (No Model.)  3 Sheets—Sheet 3.

G. BAUM.
CARROUSEL.

No. 468,962.  Patented Feb. 16, 1892.

Witnesses:—
O. H. Maynard
C. L. Sundgren

Inventor:—
George Baum
by attorneys
Brown & Seward